United States Patent [19]

Loock

[11] 4,290,812

[45] Sep. 22, 1981

[54] PROCESS FOR THE PRODUCTION OF INKS FREE OF FOREIGN SALTS

[75] Inventor: Ehrenfried Loock, Wilhelmshaven, Fed. Rep. of Germany

[73] Assignee: Olympia Werke AG, Wilhelmshaven, Fed. Rep. of Germany

[21] Appl. No.: 173,069

[22] Filed: Jul. 28, 1980

[30] Foreign Application Priority Data

Jul. 27, 1979 [DE] Fed. Rep. of Germany ....... 2930491

[51] Int. Cl.³ ..................... C09D 11/00; C07C 107/00
[52] U.S. Cl. ....................................... 106/22; 260/208
[58] Field of Search ........................... 106/22; 260/208

[56] References Cited

U.S. PATENT DOCUMENTS

| | | | |
|---|---|---|---|
| 1,787,233 | 12/1930 | Bivins | 106/22 |
| 3,705,043 | 12/1972 | Zabiak | 106/20 |
| 3,846,141 | 11/1974 | Ostergren | 106/22 |
| 3,994,872 | 11/1976 | Kuster | 106/22 |
| 4,101,329 | 7/1978 | Loock | 106/22 |
| 4,159,203 | 6/1979 | Loock | 106/22 |

*Primary Examiner*—Lorenzo B. Hayes
*Assistant Examiner*—Amelia B. Yarbrough
*Attorney, Agent, or Firm*—Spencer & Kaye

[57] ABSTRACT

A method for the production of an ink suitable for use in ink-jet printing, free from foreign salts, made from technical dyes. A highly water-soluble dye is dissolved in water and precipitated with a precipitant amine. The precipitate is separated from the solution and distilled with water and a water-soluble amine of low volatility to convert the dye back to a soluble form.

21 Claims, No Drawings

PROCESS FOR THE PRODUCTION OF INKS FREE OF FOREIGN SALTS

BACKGROUND OF THE INVENTION

The present invention relates to a process for the production of aqueous inks, free of foreign or extrinsic salts, from technical dyes.

In ink-jet printing methods, a printing or ejection head which is supplied with ink from an ink reservoir, transfers ink in droplet form onto a print carrier. Short-term or temporary pressures are generated by a ceramic oscillator in the cavities of this printing head, and these pressures lead to the ejection of ink from capillary nozzles. A clean printed image requires droplets of equal size. These droplets must be applied to the print carrier in a grid pattern. Among the factors influencing production of droplets of equal size are the nozzle geometry and the configuration of the break-off plane, as well as the wetting behavior of the ink within and/or outside of the nozzles. To stabilize the ink meniscus in the nozzles after breakup of the droplets and to form the droplets, the ink must exhibit a surface tension which is as high as possible.

The ink is supplied into the nozzles of the ink-jet printing head, in part, by way of capillary cross sections, and will normally continue to flow without the application of pressure. In order to attain a flow of ink in sufficient amounts to achieve a high droplet sequence, and thus a high ejection speed, the ink must have a low viscosity, preferably around 2 cp. During relatively long periods of inactivity between printing periods, ink components must not crystallize out in the area of the printing head and the ink components must not colloidally segregate from the ink. Moreover, there must not be any surface film formation in the nozzle opening as a result of evaporation of water.

It is important that the ink does not attack the materials which make up the printing head. Since the printing head may comprise, for example, individual small steel plates which are bonded to one another into a package by a diffusion welding process, the ink should not attack steel or the intermediate, diffusion welding layers.

A number of inks have been disclosed for use, for example, in printing methods employing ink-jet printing. These inks, however, do not always completely satisfy the required ink parameters.

Anionic dyes of high water solubility are used for the manufacture of inks for use in ink-jet printers of the type discussed hereinabove. Such technical dyes are usually available in the form of sulfonic acid sodium salts, and generally contain fairly large amounts of foreign salts, such as NaCl, $Na_2SO_4$ and $Na_2CO_3$. These salts are unavoidably contained in the dyes due to the manufacturing method of the dyes, or they are added to the dyes as processing aids. The salts increase the risk of corrosion by the ink and the tendency of the ink to crystallize. Additionally, the solubility of the dye in auxiliary solvents is greatly reduced due to the presence of these salts.

An aqueous black ink suitable for a printing method where the ink is transferred in droplets onto a print carrier along with a method for its manufacture are disclosed in U.S. Pat. No. 4,159,203. As the dye salts, two direct dyes are used which are not black. These dyes form a genuine or true solution with a solvent, for example, formamide. While the dyes are completely dissolved in the mixture, the foreign salts, obtained in the production of the dye or also added subsequently, such as sodium sulfate and/or sodium carbonate, can be removed by coarse filtration. The sodium chloride salt, soluble up to 9 g per 100 g of solvent, dissolves completely, if the solution is stirred too much. In the case of insufficient stirring, a large amount of the dyes will not dissolve, so that the provided concentration of dye in the ink will not be obtained. A concentration of the filtrate by distillation is difficult due to the high boiling point of formamide (212° C.), so that formamide is left as the solvent in the ink to be manufactured. As a result of this presence of formamide, the number of different ink versions is greatly restricted.

SUMMARY OF THE INVENTION

It is an object of the present invention to provide a method for manufacturing inks suitable for use in ink-jet printing systems, which contain at least one dye and at least one solvent therefor, but which do not contain foreign salts or ingredients which promote corrosion.

To achieve this and other objects and in accordance with its purpose the present invention provides a process for the production of an ink, free from foreign salts, from a technical dye, comprising:

(a) dissolving at least one highly water-soluble dye in water to form an aqueous solution;

(b) precipitating the dye from the aqueous solution by adding a precipitant organic amine to form an insoluble precipitated dye;

(c) separating the insoluble precipitated dye from said solution;

(d) converting the precipitated dye into a highly water-soluble form by distillation in the presence of a water and a water-soluble amine of low volatility; and (e) dissolving the water-soluble dye obtained in step (d) in a solvent to obtain a dye solution.

It is to be understood that both the foregoing general description and the following detailed description are exemplary, but are not restrictive of the invention.

DETAILED DESCRIPTION OF THE INVENTION

The present invention makes use of the discovery that it is possible to selectively precipitate highly water-soluble dyes, even from an aqueous solution. Thus, a soluble anionic dye can be precipitated by the addition of a precipitant organic amine, and separated from the solution containing the foreign salts. To convert the dye back to its soluble form, it is distilled with a water-soluble organic amine of low volatility.

The dyes used to produce ink according to the process of the present invention preferably are those highly water-soluble anionic dyes well known to the art for producing inks for ink-jet use. These dyes are generally supplied in the form of the sulfonic acid-sodium salt. Examples are the azo dyes of the Diamine series and the triphenyl methane dye "Ink Blue BJTN", all manufactured by Farbwerke Hoechst, AG.

In the process of the present invention the dye or a dye mixture, preferably in an amount of 2 to 20 grams/100 ml, is dissolved in water to form an aqueous solution. This dissolving step may be done at an elevated temperature, for example, 50° to 100° C., to improve the solubility of the dye and coarsen the later precipitate. To this solution is added an organic amine suitable for precipitating the dye. This organic amine is referred to as a "precipitant amine" throughout the present specification and claims. This precipitant amine will be an amine of the cyclohexyl- or dicyclohexylamine type, preferably in the form of a weakly acidic salt, such as the citrate salt. The pH of the aqueous solution is generally adjusted to 4–6. A 20 percent solution of this precipitant amine salt in water is used for precipitating, preferably in an amount of 5 to 50 g/100 ml of aqueous dye solution.

The precipitated dye, generally in the form of a salt, is then separated from the aqueous solution which contains the foreign salts. Usually, this separation will be done by filtration, but any other suitable method of separation may be used. If desired, the precipitate dye may be washed to remove residual salts. Further, this precipitate material may be treated as an intermediate material and dried and stored.

Conversion of the precipitate to a water-soluble form is done by distillation. The precipitate is combined with a highly water-soluble organic amine of low volatility, preferably diethanolamine, and water. Examples of other highly water-soluble organic amines of low volatility which can be used in the present invention are ethanolamine and triethanolamine. The ratio of precipitate, organic amine, and water is 1:(0.5–10):4.5 minimum. The water soluble organic amine should have a boiling point of 150° C. minimum.

This mixture of precipitate, organic amine of low volatility and water is distilled, preferably under vacuum, in order to keep the temperature low, thereby avoiding damage to the dyes. A temperature of about 70° C. is desirable.

During the distillation, an equilibrium is formed involving the precipitated dye salt ($A_1 D$), the precipitant amine ($A_1$), the highly soluble amine of low volatility ($A_2$) and the anionic dye (D):

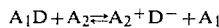

$$A_1 D + A_2 \rightleftharpoons A_2^+ D^- + A_1$$

The volatility of each amine usable as $A_1$ or $A_2$, is indicated by its boiling point. The cyclohexylamine and dicyclohexylamine precipitant amines ($A_1$) having boiling points of about 134° C. and 256° C., respectively. The highly soluble, low volatility amines ($A_2$) ethanolamine, diethanolamine and triethanolamine having boiling points of about 171° C., 270° C., and 327° C., respectively.

By distilling the mixture, the precipitant amine is removed in preference to the highly soluble amine of lower volatility. This preferential removal of the precipitant amine causes the equilibrium to shift to the right, and eventually only the pure soluble amine dye salt ($A_2 D$) will remain, since the water will also be distilled off. The dye is then mixed with water and if desired, other suitable solvents and additives, to form the ink for ink-jet printing.

The pure dyes which are obtained by the process of the present invention, preferably in the form of diethanolamine salts, show no tendency toward crystallization, making them especially suitable for production of ink for ink-jet systems. They are miscible with water and with many organic solvents, particularly water miscible solvents, in any desired ratio, making possible the preparation of dye solutions of very high concentration.

Solvents which may be used include water, glycols, glycerol, amides like formamide or bis-2-Hydroxyethyl-acetamide, amines like ethanolamines- and propanolamines, some sulfones like tetrahydro-thiophen-1,1-dioxide or bis-2-hydroxyethyl-sulfone, sulfoxides like dimethyl-sulfoxide and similar water miscible solvents or mixtures of them. It is possible to prepare inks containing 50 g dye/100 ml, which are dilutable with one or more of said solvents, if desired.

It is to be understood that the process hereinabove described may equally be used for other purposes where dyes free of foreign salts are desired, such as in the preparation of printing inks, inks for color ribbons, and the like.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Either one or two azo dyes, Diamine Blue 6B (C.I. Direct Blue 15-C.I. 24400), Extra Highly Concentrated, or Diamine Genuine Scarlet 4BS (C.I. Direct Red 23-C.I. 29160), Extra Concentrated, both manufactured by Farbwerke Hoechst A. G., is added in an amount of 10 grams to 100 ml of water under agitation. To improve the solubility characteristics and to obtain coarse-grain salt precipitates, the bath was heated. To this dye-water mixture was added an aqueous solution containing weakly acidic dicyclohexylamine citrate. The dicyclohexylamine citrate solution was of about 20% concentration and had a pH of 4 to 6.

The citrate solution was added until there was caused precipitation of the pure dyes as the dicyclohexylamine salt. The end point of the precipitation was determined by applying the aqueous mixture to filter paper. Thereafter, the precipitate was vacuum-filtered and washed with distilled water. It was determined that the inorganic compounds of the dyes, in particular the sodium salts, which were contained in the original dye-water mixture, were now in the filtrate and thus separated from the precipitated dyes.

To the precipitated dye salt were added diethanolamine (boiling point 268.8° C.) and water in an approximate ratio of 1:2:10, respectively. The mixture was distilled on an evaporator under vacuum, at a bath temperature of about 70° C. The dicyclohexylamine, which has a boiling point of 255.8° C. at atmospheric pressure, is distilled off while adding water repeatedly, in order to remove even residual traces of the dicyclohexylamine.

The diethanolamine dye salts were recovered in the distillation residue as a viscous liquid showing no tendency towards crystallization. These dyes were mixed with water to prepare an ink.

EXAMPLE 2

The two azo dyes described in Example 1 were added to water under agitation, in an amount of 20 grams total in 100 ml, twice the concentration of Example 1. An excess of aqueous weakly acidic cyclohexylamine citrate solution of about 20% concentration having a pH of about 6 was added, causing precipitation of the dye. After cooling, the resulting dye precipitate was filtered and washed, then dried at 60° C. This intermediate dry substance could be stored.

To convert the dye to its soluble form, to the dye precipitate were added, diethanolamine and water in an approximate ratio of 1:2:10, respectively. Cyclohexylamine (boiling point at atmospheric pressure = 134.5° C.)

is removed by direct distillation under vacuum at a bath temperature of 70° C. The low bath temperature and vacuum prevented damage to the dyes. Once again, the soluble diethanolamine dye salts remained in the distillation residue as a viscous fluid.

It will be understood that the above description of the present invention is susceptible to various modification, changes and adaptations, and the same are intended to be comprehended within the meaning and range of equivalents of the appended claims.

What is claimed is:

1. A process for the production of an ink, free from foreign salts, from a technical anionic dye, comprising:
   (a) dissolving at least one highly water-soluble dye in water to form an aqueous solution;
   (b) precipitating the dye from this aqueous solution by adding a precipitant organic amine to form an insoluble precipitated dye;
   (c) separating said precipitated dye from said solution;
   (d) converting said precipitated dye into a highly water-soluble form by distillation in the presence of water and a water-soluble amine of low volatility; and
   (e) dissolving the water-soluble dye obtained in step (d) in a solvent to obtain a dye solution.

2. Process according to claim 1 wherein said anionic dye is a sulfonic acid sodium salt.

3. Process according to claim 1 wherein said anionic dye is an azo type dye.

4. Process according to claim 1 wherein said precipitant amine is a compound of cyclohexylamine or dicyclohexylamine.

5. Process according to claim 4 wherein said compound is cyclohexylamine citrate or dicyclohexylamine citrate.

6. Process according to claim 5 wherein said compound is added in an aqueous solution of about 20% by weight concentration with a pH adjusted to about 4 to 6.

7. Process according to claim 1 wherein said separation takes place by filtration.

8. Process according to claim 7 wherein said filtration takes place by vacuum filtration.

9. Process according to claim 1 wherein said water-soluble amine of low volatility is diethanolamine.

10. Process according to claim 9 wherein said distillation takes place under vacuum.

11. Process according to claim 10 wherein said vacuum distillation takes place at about 70° C.

12. Process according to claim 9 wherein the weight ratio of precipitated dye:diethanolamine:water is about 1:2:10.

13. Process according to claim 1 wherein said solvent comprises water.

14. Process according to claim 1 comprising in step (a) dissolving said dye while the water is at an elevated temperature.

15. Process according to claim 1 wherein 10 grams of dye is dissolved in 100 ml water, an aqueous weakly acidic dicyclohexylamine citrate solution is added to completely precipitate the dye, and the precipitate is vacuum filtered and washed with water.

16. Process according to claim 15 additionally comprising dissolving said dye while the water is at an elevated temperature.

17. Process according to claim 15 wherein the dicyclohexylamine citrate solution has a concentration of about 20% by weight and is adjusted to a pH of about 4 to 6.

18. Process according to claim 1, wherein 20 grams of dye is mixed with 100 ml water, the precipitation is conducted with an aqueous weakly acidic, cyclohexylamine citrate solution and the precipitate is vacuum filtered and washed with water.

19. Process according to claim 18 wherein comprising in step (a) mixing the dye with water which is at an elevated temperature.

20. Process according to claim 18 wherein said cyclohexylamine citrate solution has a concentration of about 20% by weight and is adjusted to a pH of about 6.

21. Process according to claim 4, wherein said precipitated dye is converted to a water-soluble form by mixing with diethanolamine and water in a dye:diethanolamine:water weight ratio of about 1:2:10, and distilling the mixture under vacuum to remove the cyclohexylamine or dicyclohexylamine.

* * * * *